(12) United States Patent
Billy et al.

(10) Patent No.: US 8,678,487 B2
(45) Date of Patent: Mar. 25, 2014

(54) GLAZED ROOF OF A MOTOR VEHICLE, CORRESPONDING METHOD OF ASSEMBLY AND CORRESPONDING VEHICLE

(75) Inventors: David Billy, Bressuire (FR); Pascal Fourel, Saint-Malo (FR); Xavier Sandrin, Bressuire (FR)

(73) Assignee: Wagon SAS, Bressuire Cedex (FR)

( * ) Notice: Subject to any disclaimer, the term of this patent is extended or adjusted under 35 U.S.C. 154(b) by 903 days.

(21) Appl. No.: 12/518,000

(22) PCT Filed: Dec. 6, 2007

(86) PCT No.: PCT/EP2007/063483
§ 371 (c)(1),
(2), (4) Date: Oct. 13, 2009

(87) PCT Pub. No.: WO2008/068325
PCT Pub. Date: Jun. 12, 2008

(65) Prior Publication Data
US 2010/0084894 A1 Apr. 8, 2010

(30) Foreign Application Priority Data
Dec. 6, 2006 (FR) .................................... 06/10663

(51) Int. Cl.
*B60J 7/02* (2006.01)
(52) U.S. Cl.
USPC ........................................................ 296/213
(58) Field of Classification Search
USPC ..................... 296/216.01–224, 213
See application file for complete search history.

(56) References Cited

U.S. PATENT DOCUMENTS

| | | | | | |
|---|---|---|---|---|---|
| 4,210,359 | A | * | 7/1980 | Mori | 296/222 |
| 4,364,601 | A | * | 12/1982 | Katayama et al. | 296/221 |
| 4,553,307 | A | * | 11/1985 | Kaltz et al. | 29/434 |

(Continued)

FOREIGN PATENT DOCUMENTS

| DE | 19914427 A1 | 10/2000 |
|---|---|---|
| EP | 0529288 A1 | 3/1993 |

(Continued)

OTHER PUBLICATIONS

International Search Report for corresponding International Application No. PCT/EP2007/063483, filed Dec. 6, 2007.
Written Opinion of the International Searching Authority for corresponding International Application No. PCTEP2007/063483, filed Dec. 6, 2007.

*Primary Examiner* — Dennis Pedder
(74) *Attorney, Agent, or Firm* — David D. Brush; Westman, Champlin & Koehler, P.A.

(57) ABSTRACT

A glazed roof of a motor vehicle is provided, which includes at least one opening and a fixed glazed structure bearing at least one element sliding on the inside of the vehicle and intended to close the opening(s). The glazed structure has an external contour coinciding with an accommodating surround on the chassis of the vehicle so the contour can be secured to the accommodating surround, as a flush fit. Each of the sliding elements is guided along two rails secured to the surface of the fixed structure, in a region distant from the external contour so as not to interfere with the securing of the latter to the accommodating surround. The roof has at least one retaining element, having a first end secured to one of the rails and a second end secured to the chassis. Each of the retaining elements is positioned at right angles to the rail.

17 Claims, 6 Drawing Sheets

(56) References Cited

U.S. PATENT DOCUMENTS

| | | | | |
|---|---|---|---|---|
| 5,540,478 A | * | 7/1996 | Schuch | 296/210 |
| 5,599,059 A | * | 2/1997 | Shann | 296/216.04 |
| 6,334,646 B1 | * | 1/2002 | Oami | 296/213 |
| 6,460,920 B1 | * | 10/2002 | Reinsch | 296/216.08 |
| 7,819,466 B2 | * | 10/2010 | Hirata et al. | 296/216.08 |
| 2005/0121943 A1 | | 6/2005 | Neaux | |

FOREIGN PATENT DOCUMENTS

| | | |
|---|---|---|
| EP | 1538012 A2 | 6/2005 |
| EP | 1559600 A2 | 8/2005 |
| GB | 2335397 A | 9/1999 |

\* cited by examiner

GLAZED ROOF OF A MOTOR VEHICLE, CORRESPONDING METHOD OF ASSEMBLY AND CORRESPONDING VEHICLE

CROSS-REFERENCE TO RELATED APPLICATIONS

This Application is a Section 371 National Stage Application of International Application No. PCT/EP2007/063483, filed Dec. 6, 2007 and published as WO2008/068325 on Jun. 12, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of roofs of motor vehicles. More precisely, the disclosure concerns glazed roofs comprising at least one opening cooperating with a movable sliding glazed panel.

In the present patent application, sliding means the case where the glazed panel remains permanently parallel to a reference plane (decomposition of its displacement in two rectilinear movements) as well as where it has a slanting displacement.

BACKGROUND OF THE DISCLOSURE

The current tendency in the subject of motor vehicles, whether an automobile, a utility vehicle, a lorry or a bus is concerned, is to propose more and more glazed surfaces. Thus, in particular, vehicles have been proposed which have a roof equipped with one or more glazed elements. In certain cases, the whole of the roof is made of glass or of a similar material, allowing the rays of the sun to pass.

So as to increase the window space, moreover, attempts have been made to propose large-sized glazed surfaces, whilst minimizing the number of glazed panels of the roof.

One has likewise had to take into account the fact that these glazed surfaces must be integrated in the roofs of current or future vehicles which have stream-lined shapes and are generally not flat and are more often incurvated or curved in the widthwise direction and likewise occasionally in the lengthwise direction.

Furthermore, solutions have been proposed for clearing openings in the roof, in particular so as to be able to form an opening roof module.

Thus, a technique which is currently prevalent for the opening and closing of the roof panes, and particularly "opening roof" panes uses half-opening movable panes, mounted on a frame and being able to tilt about an axis integral with the plane of the roof, to provide a reduced opening of the pane, generally small in size.

This technique presents the disadvantage of only allowing a partial freeing of the opening coinciding with the surface of the pane when the latter is reclosed.

Another opening roof technique which is likewise used in a conventional manner consists in making the pane movable above or below the roof in a plane substantially parallel to the plane of the roof. Thus, a first technique is known of a roof opened by an opening being able to be covered by a sliding glazed panel housed in the fittings of the roof. A disadvantage of this technique is that the dimensions of the openings in the roof, and consecutively of the glazed surfaces allowing them to be covered, are limited.

In the case where this approach is taken for glazed surfaces covering the width of a roof, it has been proposed to slide the edges of the pane in guide rails arranged along the frames of the roof.

It has likewise been proposed to slide the movable pane at least partially along the rear window or to make the movable pane penetrate or leave a specific housing situated, for example, in the upholstery of the roof to increase the opening area in the roof.

However, this technique presents numerous disadvantages.

Thus, this technique of guiding the edges of the pane prescribes that the edges of the glazed panel guided in rails are parallel, or in other words, a rectilinear guiding, to avoid non-aesthetic apertures which could appear between the guided edges of the pane and the roof. Numerous adaptations result from this, to secure the sliding pane to the body, whilst following the longitudinal profile, generally curved, of the roof and in particular to conceal, by placing additional caches, the means for guiding, actuating and entraining, which reduces the glazed surface of the roof.

Moreover, from the aesthetic point of view, this technique does not allow a smooth appearance to be obtained, viewed from the exterior, flush with the body, in the presence of a guide frame of the movable pane.

Furthermore, the means for guiding, actuating and entraining of the movable pane are heavy, cumbersome and complicated to mount. It is therefore necessary to provide a housing volume as a result, prejudicing the available volume inside the vehicle, if the movable pane slides inside the vehicle.

In addition, they have a high manufacturing cost and conventionally pose problems with regard to tightness. Mounting on the vehicle, and maintenance, are equally complex. Furthermore, they impose constraints from the point of view of ergonomics.

SUMMARY

An aspect of the disclosure relates to a glazed roof of a motor vehicle, comprising at least one opening.

According to an illustrative embodiment of the invention, a roof such as this comprises a fixed glazed structure bearing at least one element sliding on the inside of the said vehicle and intended to close said or one of said openings. Said glazed structure having an external contour designed to coincide with receiving surround provided for this purpose on the chassis of said vehicle so that said contour can be secured to said receiving surround, in a flush manner, each of said sliding elements being guided along two rails which are secured to the surface of said fixed structure, in a region distant from said external contour so as not to interfere with the securing of the latter to said receiving surround.

The roof of an embodiment of the invention likewise comprises at least one retaining element, a first end of which is secured to one of said rails and the second end of which is secured to said chassis, each of said retaining elements being positioned at right angles to said rail.

Thus, a roof is obtained which is simple to produce and to mount, offering a good quality of opening and being able to be varied to offer a wide range of functionalities, shapes and appearances (for example offering one or more openings of a size being able to be adjusted simply, . . . ). Moreover, the roof which is thus implemented meets the current requirements and expectations in particular in terms of aesthetic quality, due to the flush appearance of the roof, security with respect to glass breakages due to the presence of the retaining element, aerodynamic qualities, ease of mounting and, for certain models of vehicle, of weight of the roof.

The importance of the retaining element should be noted, which is able to take the form of a T shape, for example, for the approval of such a roof with regard to the regulatory and/or legislative aspects relating to the safety of vehicles. In fact, it is important that, in the case of breakage of the glazed structure, the movable element remains kept integral with the body (although it is no longer integral with the glazed structure, which has been destroyed), and does not fall onto the passengers in the vehicle.

The rails guiding along which the said sliding elements are guided can additionally comprise guiding means for a blind and/or a shielding screen for at least a part of the surface of the glazed structure and/or sliding elements.

Advantageously, said rails carry staggering means of the sliding element to which they are associated, so as to bring the said sliding element in the plane of the said fixed glazed structure, to close the said opening.

Thus, a sliding element can be brought from its sliding plane, preferably situated under the glazed surface, in the plane of the glazed surface of the roof, for example, in a vertical movement or else in a movement combining a horizontal displacement and a vertical displacement.

Preferably, the staggering means comprise assistance and/or reduction means, facilitating the passage in the plane of the said fixed glazed structure.

Thus, the stresses are reduced for manipulating the sliding element, which is particularly advantageous for a manipulation making it necessary to have one's arms stretched or partially stretched upwards, that the space provided for moving in the cab of a vehicle remains limited, even tiny, and the weight is opposed to the displacement upwards of the sliding element.

Advantageously, such a roof comprises means for locking the said sliding element in at least one predetermined position.

Thus, the opening of the roof can be kept closed in simple and effective manner. In addition, provision can be made that the sliding element can be blocked in several partial and/or complete opening positions of the roof, with the aid of the same means.

According to a preferred aspect, the said locking means comprise at least one locking bolt, collaborating with at least one strike formed in one of the said rails, and actuating means of the bolt or bolts. The said sliding element having a first and a second edge substantially perpendicular to its sliding axis, the said bolt or bolts are mounted in the vicinity of the said first edge and the said actuating means are mounted in the vicinity of the said second edge, transmission means connecting the said actuating means and the said bolt or bolts.

Thus, it becomes easy to mount and conceal the locking means by arranging them on the contour of the sliding element, placing the actuating means in an accessible manner.

According to a preferred complementary aspect, such a roof comprises two bolts cooperating respectively with each of the said rails, and the said actuating means are placed in the middle of the said second edge.

According to another advantageous aspect, at least one of the said sliding elements comprises at least one reinforcement element extending substantially perpendicularly to its sliding axis.

Thus, in the case of the accidental splintering of the sliding element or of the glazed structure, the chassis and the body of the vehicle, and in particular the surround defining the roof are held in a reinforced manner, the reinforcement being opposed to their deformation. Moreover, it is then possible to fix more substantial loads on the sliding element, without the latter altering its capacity to slide in a satisfactory manner in the rails.

In an advantageous embodiment of the invention, the said sliding element comprises a functional frame extending over its contour.

Thus, on the one hand one has a cache for, for example, shielding the locking means from view, and on the other hand a support to receive functional elements such as lighting means, . . . .

Advantageously, the said functional frame forms and/or carries the said reinforcement elements.

For example, the frame and the reinforcement elements can be thermoformed, or injected, in the same operation, which reduces the manufacturing costs of the roof.

Advantageously, the said reinforcement means cooperate with the said rails and/or the said retaining means and/or the said receiving surround.

According to a still further advantageous aspect, at least one of the said sliding elements comprises means for recovery and evacuation of liquid.

Thus, the roof allows the evacuation of rain water or condensation which is deposited on the sliding element and which risks pouring by gravity into the cab when the sliding element is unlocked or displaced.

Preferably, the said functional frame carries at least one reservoir.

Advantageously, such a roof comprises connection means, at least in an open position of the said sliding element, of the said reservoir or reservoirs to means for evacuation of liquid towards the exterior of the said vehicle.

Thus, the water can be evacuated whatever the opening position of the sliding element.

According to another advantageous aspect of an embodiment of the invention, the said sliding element carries a tightness joint, mounted so as to direct the liquid towards the said reservoir or reservoirs.

According to another advantageous aspect, the said sliding element or elements and/or the said locking means are motorised.

Advantageously, the said sliding element or elements and/or the said locking means are controlled by remote control means.

Thus, it is not necessary for the occupant of the vehicle to "contort" himself to displace or lock the sliding element, which is particularly advantageous when the amplitude of the displacement and/or the mass of the sliding element are great.

According to a particular embodiment of the invention, the said fixed glazed structure and/or the said sliding element or elements comprise an assembly of superimposed elements, formed of at least two transparent elements secured by a connecting frame.

Transparent is understood to mean an element allowing light to pass, at least partially, in particular this expression includes panes which are tinted or treated against certain radiations.

Thus, one of the transparent elements can be employed to provide a particular appearance to the sliding element and the other transparent element to provide the required technical characteristics. This likewise allows the thermal and acoustic insulation to be reinforced, in particular by trapping a sheet of air "sandwiched" between the two elements. It should be noted that the transparent elements of the assembly can be made of the same material, for example glass (one would then speak in terms of double glazing), organic glass, . . . or of different materials, for example by assembly of an element made of glass on an element made of organic glass (preferably, one will then designate such an assembly by the term "double skin").

Preferably, the said fixed glazed structure and/or the said sliding element(s) comprising an assembly of superimposed elements carries at least one blind or a shielding screen of at least a portion of the transparent surface.

As has been previously indicated, it should be noted that provision can be made that the said rails along which the said sliding elements are guided comprise guiding means, including for example a guiding slide to guide the blind and/or the screen. Preferably, at least one of the said blinds or screens circulate between the said transparent elements.

Thus, the blind or the screen does not extend inside the cab and therefore does not reduce the interior space. This can likewise allow one to be free of the presence of ribs.

According to a particularly advantageous aspect, the said fixed glazed structure and/or the said sliding element or elements present at least one curve.

Thus, the roof has an appearance which is in accordance with the current expectations from the aesthetic point of view.

Advantageously, the said rails and/or guiding means of at least one of the said sliding elements are shaped so as to compensate at least one of the said curves.

Thus, the gap which is capable of appearing between the generally rectilinear base of the rail or rails and the glazed structure is compensated.

According to an advantageous embodiment of the invention, at least one of the said curves is imposed on the said fixed glazed structure and/or at least one of the said sliding elements by means of one of the said rails, the latter being preformed.

Thus, it is not necessary to realize the curve in two directions of the glazed structure on its manufacture, which simplifies the latter.

According to a particular embodiment of the invention, such a roof comprises two openings, and two sliding elements.

Thus, for example, the driver and his front passenger, or the occupants of the front and rear seats of the vehicle, can have their own opening in the roof. If should be noted that, preferably, such a roof comprises at most two openings and two sliding elements, so as to not be compelled to restrict the mobility of the sliding elements and/or to reduce the size of these elements to take into account a geometric interference of these elements in the opening position.

According to a still further particular embodiment of the invention, the said fixed glazed structure is formed by at least two distinct portions.

According to an aspect of the preceding embodiments, the said glazed structure comprises two symmetrical portions, each carrying an opening.

It is therefore possible to envisage sharing a common rail, substantially arranged on the central axis of the roof, to guide each of the two sliding elements.

Advantageously, at least one of the said sliding elements comprises balancing means, tending to control the displacement of the said sliding element.

Thus, the sliding element can be guided in a sliding manner whilst remaining substantially centred on the main axis of the roof so as to provide a satisfactory aesthetic effect.

According to another particular embodiment of the invention, the said rails are not parallel.

Thus, the rails can be housed along side frames, which are generally not parallel, of a current vehicle without additional adaptation to conceal them (for example by serigraphy) and hence without reducing as far as possible the window light area. In addition, such rails can adapt themselves to the guiding of a sliding element of non-rectangular, for example trapezoidal, shape.

Preferably, the said fixed glazed structure and/or at least one of the said sliding elements is realized according to one of the modes of manufacture belonging to the group comprising:
  injected organic glass;
  extruded organic glass;
  thermoformed organic glass;
  hardened glass;
  laminated glass;
  the assembly of two superimposed layers.

The term organic glass groups together, for example, materials such as polycarbonate and methyl polymethacrylate, and more generally means any plastic material manufactured according to an entirely synthetic process. Furthermore, in the case of an assembly of two superimposed layers of glass, "sandwiching" a sheet of air, the term "double glazing" or "double skin" will be used indifferently.

Thus, the normative obligations are met with regard to safety in the case of breakage of the glazed surface. It will be noted that polycarbonate can, in certain cases, be preferred so as to reduce the total mass of the roof.

According to an advantageous aspect of an embodiment of the invention, such a roof carries at least one of the items of equipment belonging to the group comprising:
  antennas;
  carrying systems such as, for example, racks, roof bars, . . .
  tightness joints;
  reinforcement elements, for example substantially similar to a structure frame, a traverse, a side-frame, . . . ;
  filtering and/or aeration and/or ventilation means;
  trims and/or contour joints;
  exterior protection films
  aerodynamic appendices;
  personalisation means;
  means for fixing fittings and/or interior covering;
  rear view mirrors;
  interior and/or exterior lighting means;
  photovoltaic cells;
  heating and/or defrosting means;
  concealment means;
  sound and/or thermal insulation means;
  sunshields;
  storage means;
  pick-ups, in particular of rain, temperature and/or sunlight.

Thus, an embodiment of the invention therefore allows pre-equipped roofs to be produced (the above list of equipment not being restrictive).

An embodiment of the invention likewise concerns a method for the mounting of roofs as described above on a motor vehicle, comprising the following stages:
  placement of the said roof on the said vehicle, such that the exterior contour of the said glazed structure coincides with the said receiving surround provided for this purpose on the chassis of the said vehicle;
  securing of the said exterior contour and of the said receiving surround, in a flush manner.

Thus, it is only necessary to attend to the adjustment of the position of the fixed glazed structure with respect to the receiving surround so that such a roof is mounted in a satisfactory manner on the vehicle. On the other hand, with the mounting of such a roof on the vehicle not necessitating a stage other than the stages of placement and securing, it can be envisaged to use, without great adaptation, an assembly line conventionally used to add a fixed roof without opening on the vehicle. The mounting of a roof according to an embodiment of the invention on a vehicle can, for example, be programmed within the framework of a rotation of vehicle series mounted on the same line, between two vehicles series having a fixed roof without opening.

Advantageously, the said securing stage comprises a simultaneous securing of the said second end with the said chassis.

Thus, the mounting of the roof on the chassis is simplified, eliminating the securing operation of the retaining element with the chassis.

An embodiment of the invention further concerns a motor vehicle equipped with one of the roofs as described above.

BRIEF DESCRIPTION OF THE DRAWINGS

Other characteristics and advantages will become apparent more clearly on reading the following description of an embodiment of the invention, given by way of simple illustrative and non-restrictive example, and the attached drawings, in which.

DETAILED DESCRIPTION OF ILLUSTRATIVE EMBODIMENTS

As already indicated, the general principle of an embodiment of the invention rests in particular on a novel approach of the realization of a glazed roof for a motor vehicle, in which an opening can be released, and which offers a flush appearance with a chassis element of the body viewed from the exterior of the vehicle.

Figure 1A:
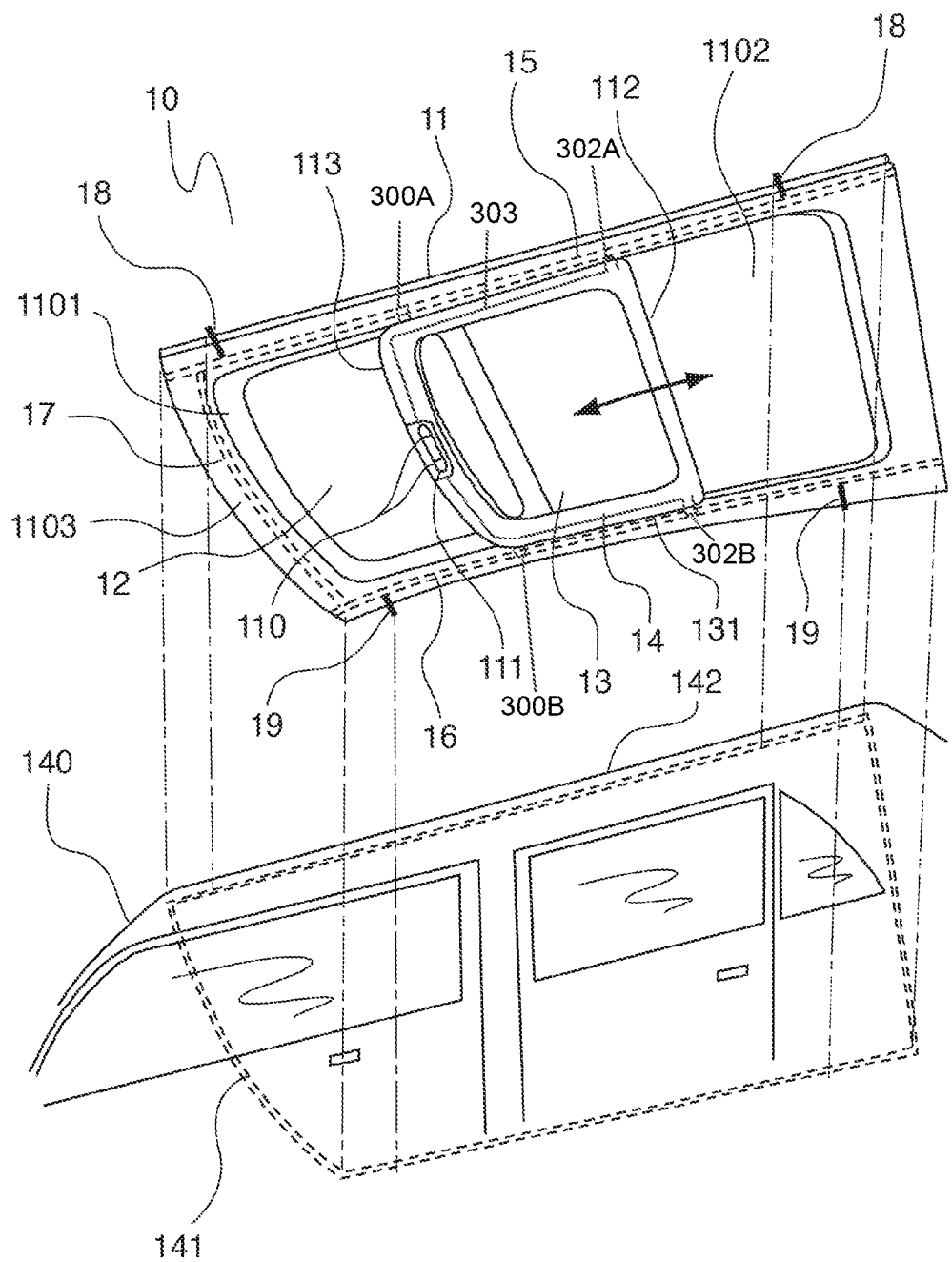
FIG. 1A illustrates in a perspective view of a roof according to an embodiment of the invention, mounted on a vehicle.

FIG. 1A illustrates, in a perspective view, a particular embodiment of the invention in which the roof 10 (hereinafter designated "flush roof") comprises a fixed glazed structure 11, pierced by an opening 12, and a movable sliding element 131 (shown in partial opening position) with respect to this fixed structure.

The glazed structure 11, for example made of hardened glass and advantageously curved to give the roof a shape meeting the current criteria in terms of design, comfort or penetration in the air . . . presents an exterior contour which coincides substantially with an receiving surround 141 on the chassis 140 of the vehicle and is secured by gluing to this receiving surround in a flush manner.

It should be noted that the technique of toric panes (i.e. presenting a significant curve in at least two directions) provided with an opening (a hole) capable for example of being disengaged or closed by means of a sliding element appears to be a solution for implementation which is well suited to the realization of a roof according to an embodiment of the invention. The opening of such a toric pane can thus be obtained by piercing or by any other satisfactory method, an example of which will be detailed below.

Thus, in this embodiment, the glazed structure is constituted by a first panel, also designated first portion 1101, constituted by a transparent material, advantageously presenting a general "U" shape to facilitate the cutting of the opening and secured by encapsulation so as to present, viewed from the exterior, a substantially flush appearance with the chassis. A second glazed panel, also designated second portion, 1102 assembled by gluing with this first glazed panel allows the exterior contour of the glazed structure to be completed. Thus, the mounting and the manufacture of the roof are facilitated compared with a glazed structure in which the opening will be cut or reserved. Furthermore, so as to prevent the risk of breakage of the second panel arranged at the front of the vehicle following a piece of gravel being projected, it can be envisaged to use a reinforced panel, for example of reinforced glass. The cost of replacement of this panel is, moreover, reduced compared with that of a panel in a single piece. According to other embodiments, the glazed structure can comprise more than two elements, or be formed of a single piece.

A mask 1103 covers the contour of the glazed structure 11.

The sliding element, under the circumstance a glazed panel 13, made for example of thermoformed polycarbonate, and provided with a functional frame 14 extending over its contour, is guided with respect to the fixed structure 11 by rails 15 and 16. These rails 15 and 16, not parallel in this embodiment, are joined, for example by gluing, welding, screwing or any other suitable technique, on the face of the fixed glazed structure turned towards the interior of the vehicle and fixed thereto on either side of the opening 12, outside the exterior contour zone of the structure 11, so as to not interfere with the chassis on the mounting and the securing of the structure to the chassis 140.

In the case of a glazed structure of several elements, the rails can take part in their assembly. They may likewise be, at least in part, moulded or overmoulded on this glazed structure.

The profile of the rails can present a slight incurvation to adapt itself to the curved profile of the fixed glazed structure of the roof. As will be seen below, the rails can likewise take part in the implementation of this curve. The rails 15 and 16 part progressively in this embodiment, approaching from the rear of the roof to follow the form of the side frames 142 of the chassis 140 of the vehicle.

Furthermore, the rails 15, 16 can be shaped so as to compensate the evolution of the curve, and more generally the transverse curve of the glazed structure 11. In fact, the rails which are currently available, if they can be easily shaped in the longitudinal direction, generally present a substantially rectangular contour section. It is therefore useful to shape the rails 15, 16 such that their surface in contact with the glazed structure 11 is of a shape adapted to the curve of the glazed structure or, if necessary, providing means for compensation of the play which is able to appear between the glazed structure 11 and the rails 15, 16.

Furthermore, the rails 15 and 16 extend substantially up to the receiving surround 141 such that the ends of the rails can be secured to the receiving surround of the chassis so as to reinforce the security and to meet normative requirements with regard to the breakage of glazed panels, and under circumstances, of the glazed structure. In a variant of this embodiment, it can likewise be envisaged that the ends of the rails are kept pressed between the fixed structure and the receiving surround of the chassis.

According to other embodiments, the connection between the rails and the surround of the body can be carried out by means of connecting pieces, or retaining elements, extending for example perpendicularly to the rail, and presenting for example a general T shape. This can be an extension formed in the mass of the rail, or of a separately added piece. In all cases, these retaining elements allow the rails to be retained, and the glazed element which they carry, even if the glazed structure which carries them is destroyed, thus protecting the occupants inside the vehicle.

It will be noted that, to facilitate legibility, the curvature of the rails 15, 16 has been voluntarily exaggerated in FIG. 1A.

Thus, in this embodiment, the panel 13 can slide whilst being guided in the rails 15 and 16 according to a substantially horizontal direction, in a sliding plane, substantially parallel to the plane of the roof 10, between one or more opening positions and an intermediate position of disengagement in which it is opposite the opening and disengaged therefrom.

A displacement, perpendicular to the plane formed by the fixed structure, allows the passage of the element 131 from the intermediate position of disengagement in which it is unlocked, to a closed, and locked, position in which the element 131 is situated in the same plane as the fixed structure, and closes off the opening.

This vertical mounting movement is advantageous, because it permits the uniform pressing of the tightness joint arranged between the element 131 and the fixed structure, which reduces the risks of the appearance of tightness defects.

Of course, other movements are possible. For example, the movement of the sliding element can follow a curve according to which the two movements (locking/unlocking and sliding) are linked.

A theft-proof traverse 17 aiming to reduce the risks of breaking in by forcing the sliding glazed panel 13 connects the end of the rails 15 and 16 oriented towards the front of the roof 10.

It should be noted that the panel 13 is likewise provided with means (not shown) facilitating its dismantling in anticipation of its replacement or repair. It may, for example, be removable retaining Ts.

Furthermore, a retaining element 18 is secured on the one hand, by a first of its ends, to the rail 15, and on the other hand, by a second end, to the chassis 140. This retaining element prevents, as already mentioned, the rail 15 from falling on the occupants of the vehicle in the case of dislocation or deterioration of the structure 11.

The retaining element may be constituted by a section of bar fixed perpendicularly to the rail and connected to the chassis. It can be removable, to facilitate the mounting or permit a replacement. It can likewise permit complementary functions of passages of water or of cables.

It generally presents a part having a small thickness, permitting its passage between the fixed structure and an adhesive strip and/or a tightness joint, without prejudicing the function of these latter.

At least one second retaining element 19, similar to the retaining element 18, completes this regulation device for making the occupants safe.

The unlocking and locking of the panel 13 are implemented by the actuation of means for actuating bolt(s), also designated handle, 110, allowing the control of the opening and/or the unlocking of the panel 13, or respectively the closing and/or the locking of the panel, by releasing this handle. When the panel 13 is in locked position, and closes off the opening 12, this handle acts symmetrically on locking means comprising a first locking bolt 302A collaborating with a strike 300A integral with the rail 15 and respectively on a second locking bolt 302B collaborating with a strike 300B integral with the rail 16. In a variant of this embodiment, provision can be made that the strikes are formed directly in the rails 15 and 16. In another variant of this embodiment, it can likewise be envisaged to lock the sliding element with a single bolt collaborating with a single strike in closed position.

The bolts are mounted symmetrically in the vicinity of a first edge 112 of the sliding element substantially perpendicular to the sliding axis of the sliding element.

In this embodiment, the handle is secured to each bolt by transmission means 303 comprising a rigid rod collaborating with a lever. In a variant of this embodiment, the bolt can be secured to an oblong pivot cooperating with the rail which participates in the disengagement or reciprocally in the closing of the sliding element.

Other transmission means can, of course, be envisaged, such as, for example, a set of cables. These transmission means are mounted in the vicinity of the second edge 113 of the sliding element substantially perpendicular to its sliding axis, the handle 110 being advantageously placed substantially in the middle of the sliding element close to this second edge 113, so as to facilitate its manipulation by the occupants of the vehicle.

Advantageously, the handle 110, when it is released, is substantially flush with the surface of a mask 111 fixed on the frame 14.

The handle 110 further comprises zones, the ergonomics of which were studied to facilitate its gripping. In a particular embodiment, provision can likewise be made for the control of opening and/or unlocking and/or entrainment by sliding of the sliding panel is implemented by actuating a motorised device for unlocking and/or sliding, controlled by means of an offset device, this motorised device being able to be equipped with anti-catching means, limiting the torque, the supply or the power of the motor if a foreign body, for example a hand, is caught between the fixed structure and the movable panel, in particular during closing. In another further embodiment, it can be envisaged to provide the handle, to secure its functioning, with a blocking button preventing its movement, in particular to protect a child who was attempting to open the movable sliding panel by himself.

Figure 1B:
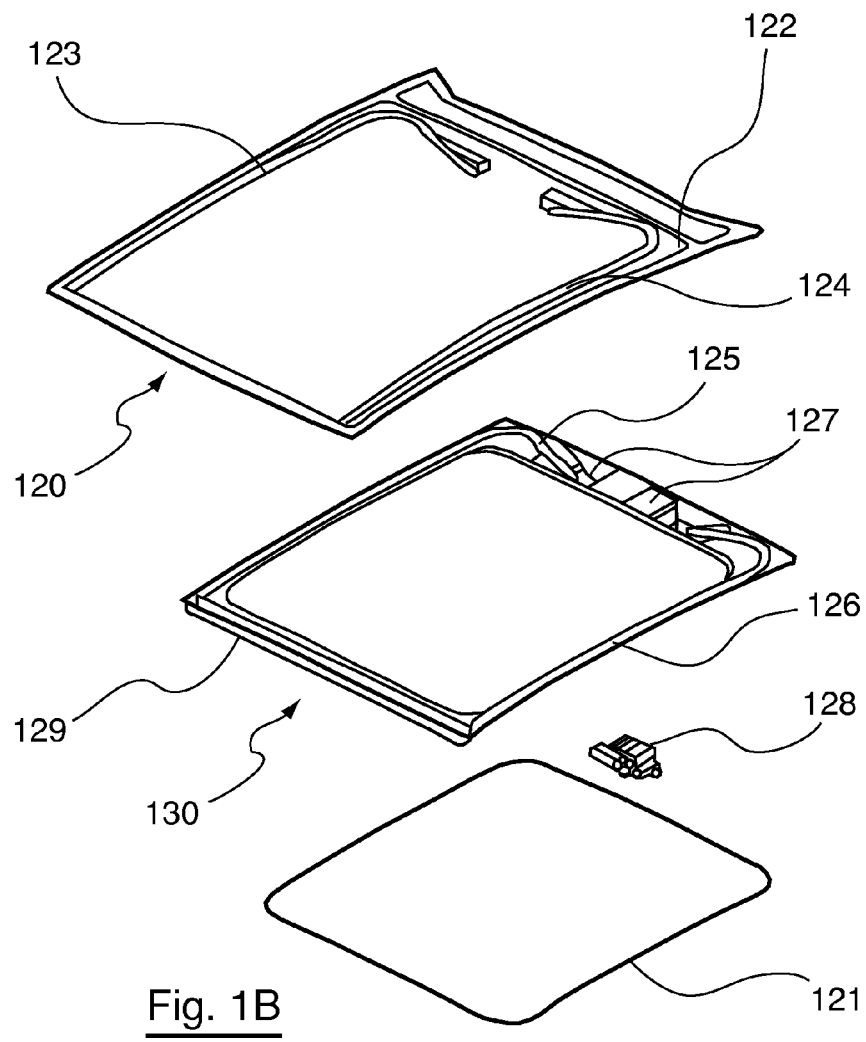
FIG. 1B presents the detail of the elements constituting the sliding element of the roof according to FIG. 1.

As will be apparent in FIG. 1B, the sliding panel of the roof is constituted by two layers presenting a curve, one layer turned towards the exterior, designated outer layer 120, and one layer turned towards the interior of the vehicle, designated interior layer 121, secured by a connection frame (not shown). Advantageously, a blind 130 is mounted on the frame 14 such that it extends between the two layers, in a space provided for this purpose. It is thus easy to guide and shape the blind, without it being necessary to provide inserted ribs or guide rails. Furthermore, the blind does not extend in the interior of the vehicle and therefore does not reduce the interior space.

Preferably, the two layers 120 and 121 are made of plastic material, such as polycarbonate, which allows, on the one hand, the weight of the roof to be reduced, and on the other hand allows the integration therein, for example by moulding or overmoulding, of several complementary technical functions, allowing the manufacture and the implementation of such a roof to be simplified and optimized.

According to the embodiment illustrated in this FIG. 1B, the exterior layer 120, made for example of polycarbonate, integrates one or more technical functions, and in particular:
  a gluing path 122;
  bead trim fixings (not shown);
  half-courses for cables 123 and 124 for the entrainment of the blind; . . . .

This layer can comprise a transparent area, corresponding substantially to the central area, and an opaque and/or coloured area, intended to conceal the technical functions (and therefore covering in particular the elements 122, 123 and 124).

The interior layer 121, likewise made of polycarbonate, can itself be wholly, or over its majority, transparent. It can likewise integrate a large number of technical functions, such as:
  half-paths of cables 125 and 126, complementary to the half-paths 123 and 124;
  fixing means of a fixing ring for the fitting (not shown);
  fixing means 127 of a motor 128 for the entrainment of the blind;
  receiving means 129 of the blind 130, for example of the roller blind type; . . . .

In a variant of this embodiment, it can be envisaged to replace the blind with a screen. In a complementary realization of this embodiment, provision can likewise be made that the fixed glazed structure presents a double glazing formed of two glazed elements, secured, by a connection frame between which a blind, when its curtain is unfolded, or a screen, allows the area of the glazed structure to be at least partially covered over.

Figure 7:
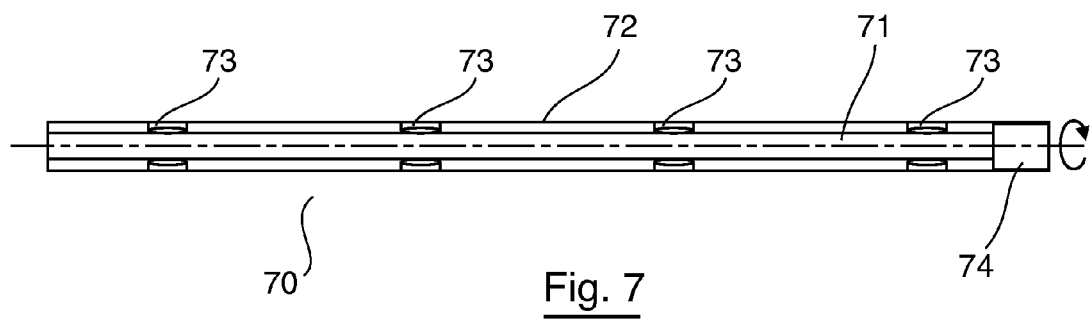
FIG. 7 illustrates, in a sectional view, the detail of the constitutive elements of a roller tube of a shield blind of the rear area of the glazed structure.

FIG. 7 illustrates in a view in section the detail of the constitutive elements of a roller tube of a covering blind of the rear surface of the glazed structure. Such a roller tube 70 is intended to be able to adopt a curve allowing the cloth of the blind to be made to conform in shape to the transverse curve of the glazed structure, taking a deflection of 15 to 25 millimetres in its central part. As specified in section in FIG. 7, such a tube comprises a fixed axis 71 surrounded by a semi-rigid casing 72, movable in rotation, on which the cloth rolls and unrolls. This casing is mounted on spherical bearings 73 authorising the covering to take the desired curve. In addition, means for entrainment 74 in rotation of the covering 72 are arranged at one of the ends thereof.

One can likewise provide a roller tube, the axis of which is curved, as presented in patent application FR-0606962 of the same Applicant as the present application.

In another variant of the embodiment presented with reference to FIG. 1, the draw bar of a blind intended to cover over the rear area of the glazed structure is secured to the rear edge of the frame of the sliding element, and the roller tube of this blind is mounted in the vicinity of the rear contour of the glazed structure or on the body at the rear of the vehicle, close to the receiving surround. Thus, on sliding towards the front or towards the rear of the sliding element, the rear area of the glazed structure not coinciding with a portion of the sliding element can be covered over efficiently and the cloth can present a satisfactory taut appearance. Means for compensation of the vertical position of the draw bar act in particular to keep the cloth close to the glazed structure when the sliding element is disengaged from the opening.

It can furthermore be envisaged to provide temporary attachment means of the draw bar, allowing it to be detached manually. In addition, in the case where provision is made to motorise such a blind, a photovoltaic cell can be fixed on the fixed structure in the vicinity of the rear traverse to supply energy to the motor of this blind in an autonomous manner.

Provision can likewise be made to substitute for the blind a screen, secured to the rear edge of the frame of the sliding element.

In another variant of this embodiment of the invention, one or more curtains of a blind can be provided to unfold under the roof and to cover over at least a part of the glazed surface of the glazed structure and, if necessary, of the sliding element.

In another further variant of this embodiment, the glazed structure and/or the sliding element can be constituted by a single layer of glazing.

Figure 2A:
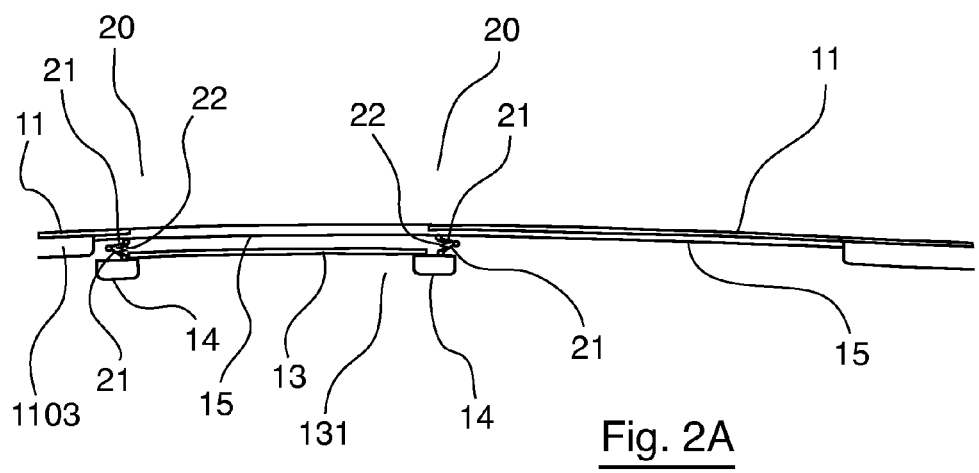
FIG. 2A illustrates, in a view in section, the detail of the device allowing the repositioning in closed position, or reciprocally the unlocking of the sliding element of FIG. 1, between the closed position and the disengaging position.
Figure 2B:
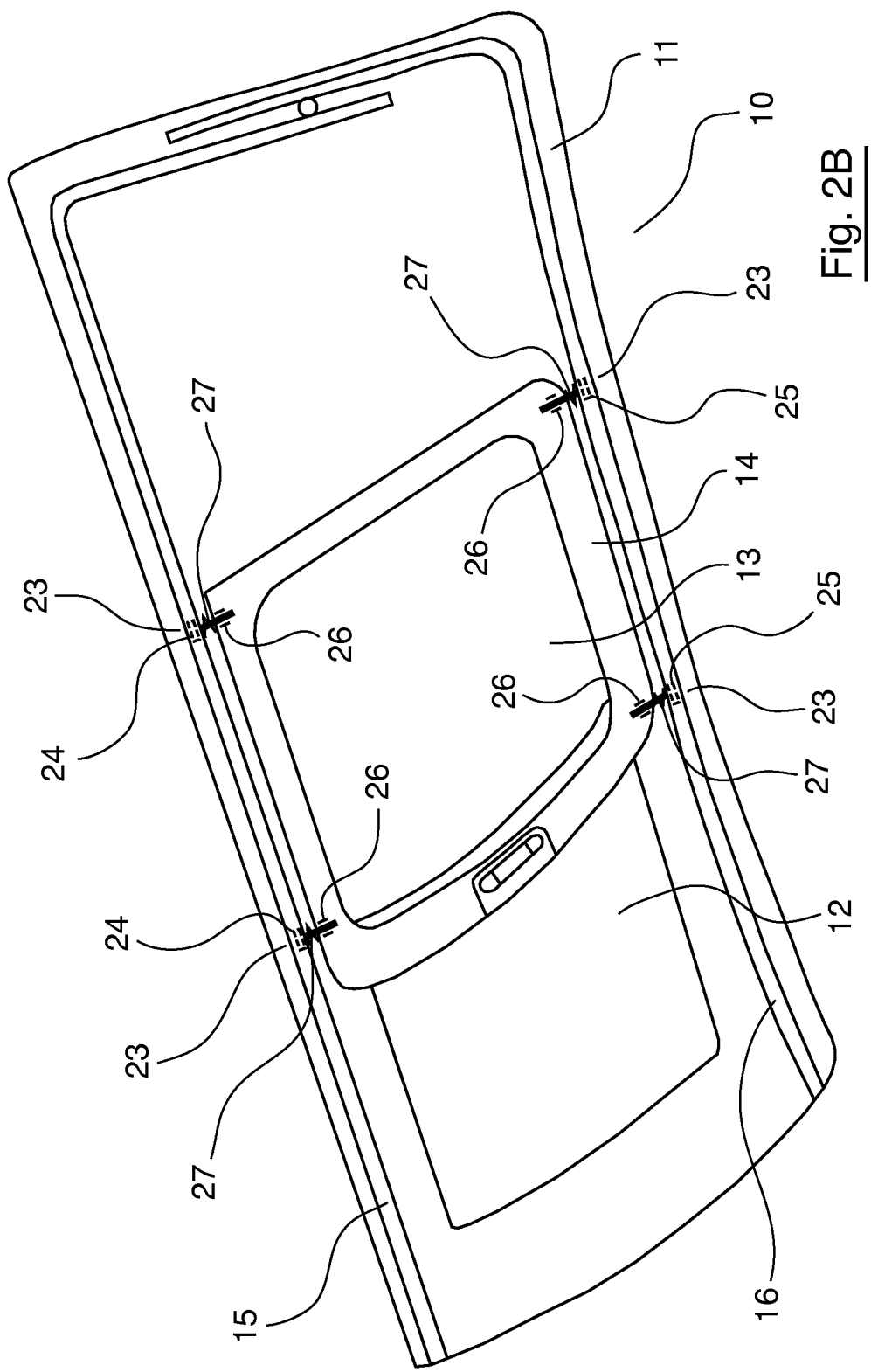
FIG. 2B illustrates, in a detail view, the sliding guide means of the sliding element shown in FIG. 1.

FIGS. 2A and 2B illustrate an example of devices for making the sliding element mobile, in detail views, respectively.

With reference to FIG. 2A, so as to permit the repositioning in closed position of the element 13 with respect to the opening 12, or vice-versa its disengagement with respect to the opening, staggering means 20 of the element 13 are provided. These means comprise two sets of articulated arms 21, each integral with a longitudinal edge 14 and resting in the rails 15, 16, tending to part under the action of assistance means 22, comprising a return spring in this embodiment of the invention, when they are released by the handle 110, so as to move the sliding element 131 upwards up to the closed position, and inversely when, under the action of the handle 110, the two arms are drawn together to allow the element 131 to be staggered in the disengagement position. Advantageously, the staggering means likewise comprise reduction means (not shown) comprising, for example, levers secured on the one hand to the arms and, on the other hand, to the frame of the sliding element, to facilitate the movement of the panel according to the vertical direction.

With reference to FIG. 2B, and so as to compensate the variable separation of the rails 15 and 16 on sliding of the element 131 being guided by these latter, the panel 13 is integral with movable guiding means 23 with respect thereto. This permits the permanent optimization of the guiding of the sliding element, whatever its position and any gap. More precisely, these guiding means 23 comprise here a first 24 and a second 25 pair of guide shoes being able to slide respectively in the rails 15 and 16. The free end of each sill-plate is mounted so as to be movable, and more precisely in a sliding manner, with respect to a slide 26 fixed on respectively a corner of the panel. In a variant of this embodiment, it can likewise be envisaged that certain guide shoes are fixed with respect to the panel 13.

In this embodiment, the guide shoes are connected by cables to an entrainment motor (not shown), housed in the chassis 140, which allows the movement of the panel to be controlled by means of an electric control, by actuation of a control button, by pressing thereon. In variants of this embodiment, provision can likewise be made to actuate the control button, transmitting to it a rotational movement, for example, or by pulling it or gripping it.

Moreover, balancing means such as, for example in this embodiment, calibrated springs 27 integral with the guide shoes, control the longitudinal displacement of the sliding element 131 such that it remains substantially centred on the axis of the roof 10.

Figure 3:
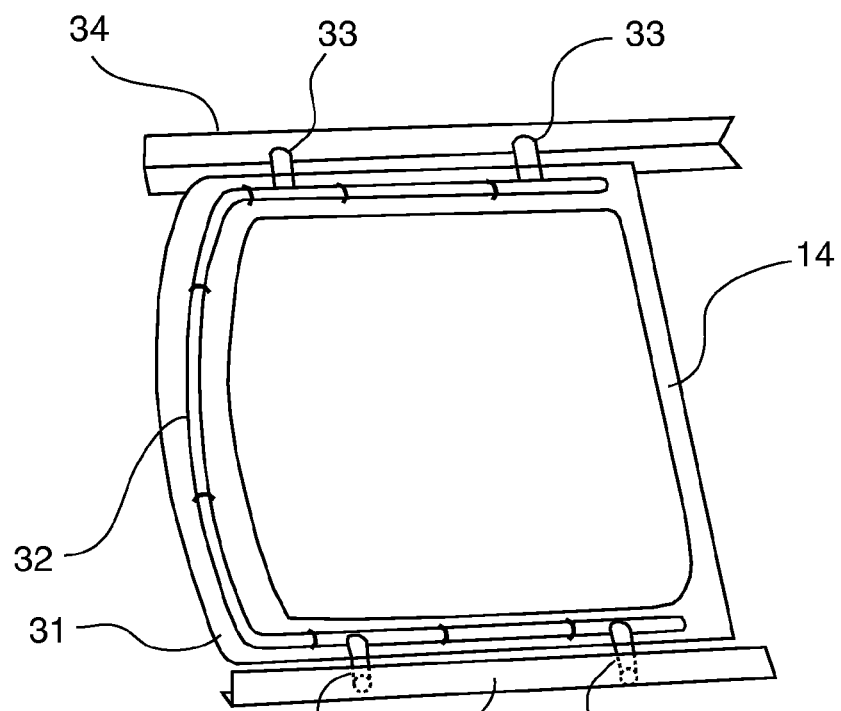
FIG. 3 illustrates the profile of a reinforcement element mounted on the functional frame of the sliding element shown in FIG. 1.

FIG. 3 illustrates the profile of a reinforcement element 31 mounted on the functional frame 14 of the sliding element 131, perpendicularly to the direction of sliding of the sliding element. Thus, the frame provided with the reinforcement element permits a structural function to be ensured in the case of the breaking of the glazed panel or of the glazed structure, retaining the sliding element. In this embodiment, this reinforcement element 31 is composed of a U-shaped metallic support 32 clipped on the frame provided on each side of the branches of the U with a bar section 33, the ends of which extend up to the chassis of the vehicle. On the sliding of the sliding element, the ends of the sections of bar move perpendicularly to retaining elements 34 presenting an angle-iron shape, and fixed inside the vehicle on each side of the chassis 140, conforming in shape to the contour of the receiving surround 141. The reinforcement element thus permits the sliding element to be supported, resting on the retaining elements 34 of each side by angle-irons in the case of breakage of the glazed structure.

Furthermore, it should be emphasized that the support 32 of the reinforcement element advantageously surrounds the sliding panel so as to protect it from lateral shocks. Moreover, to reinforce this protection, the support of the reinforcement element may, for example, be made of high-performance steel or present a section of suited shape.

In a variant of this embodiment, it can likewise be envisaged that the reinforcement element is held by the rails and/or the retaining elements.

Figure 4A:
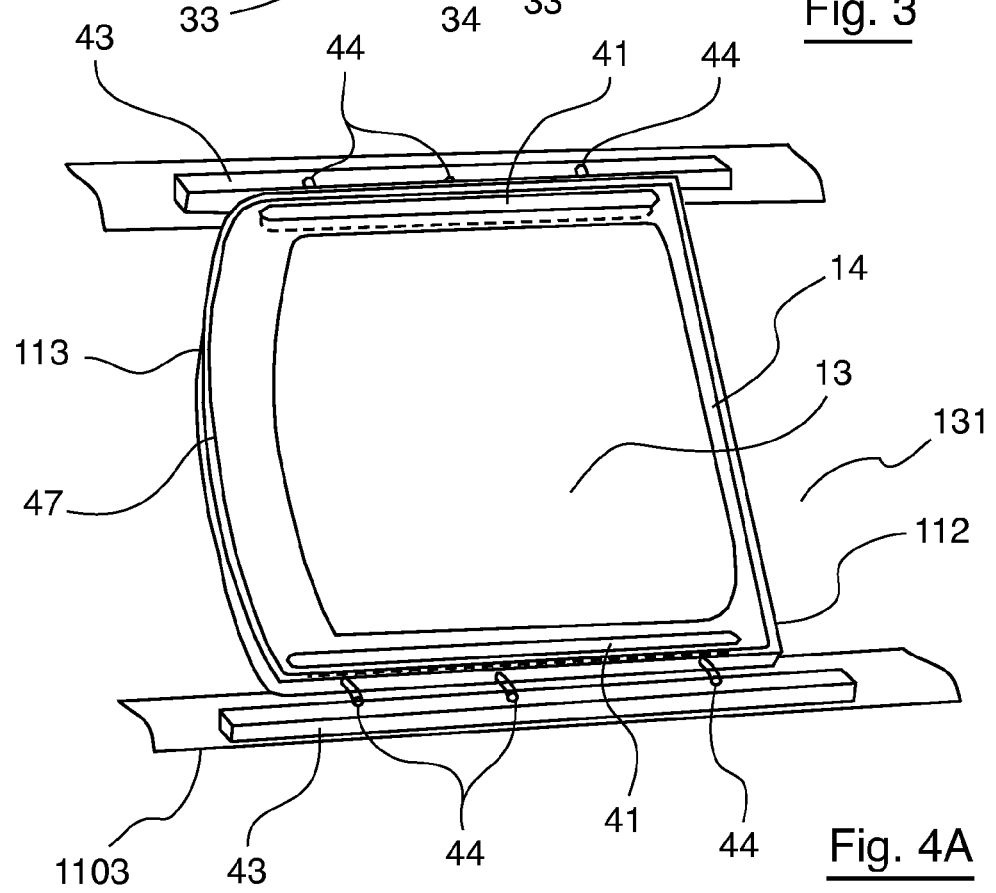
FIG. 4A presents the elements for recovery and evacuation of liquid of the roof of FIG. 1.

As illustrated in FIG. 4A in diagrammatic form, the functional frame 14 of the sliding element respectively carries two reservoirs 41 on each of these first 112 and second 113 edges, to receive the rain water or condensation depositing itself on the surface of the glazed panel 11 when the opening of the roof 10 is closed or at least partially obstructed by the sliding element 131. A tightness joint 47 is mounted on the contour of the upper face of the frame 14 of the sliding element so as to retain the water and to direct it towards the reservoirs.

Figure 4B:
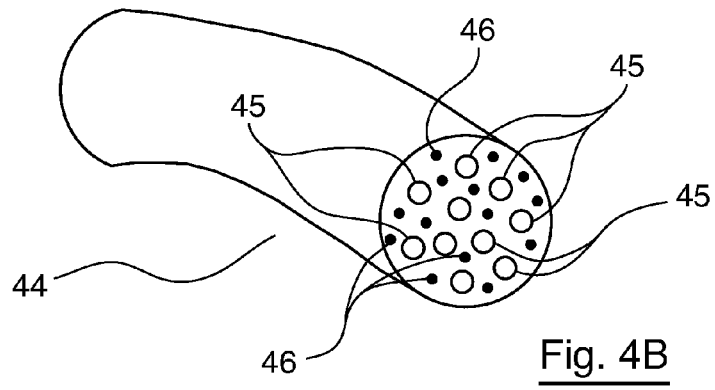
FIG. 4B is a view in section of the drains of the evacuation elements presented in FIG. 4A.
Figure 4C:
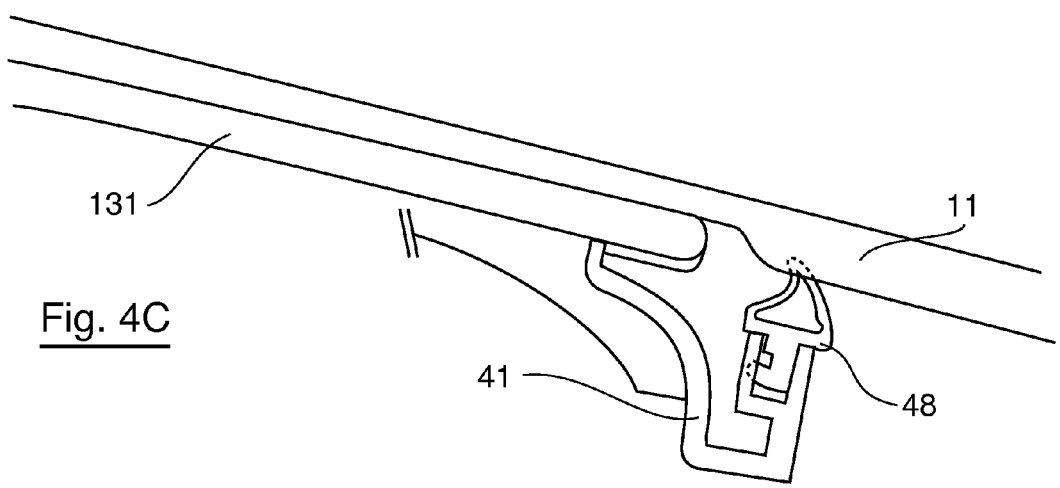
FIGS. 4C and 4D are detail views of a recovery and evacuation element of liquid from the roof in a variant of the embodiment presented with reference to FIG. 1.

The detail of a section of the reservoirs 41 is illustrated in section in FIG. 4C, the sliding element being partially disengaged from the opening of the roof. The reservoir 41 carries a joint 48, the lip of which is in contact with the surface of the glazed structure to prevent water being projected out of the reservoir in the cab of the vehicle.

So as to limit the volume and hence the space occupied by the reservoir, the latter communicates by connection means 42 with means for the evacuation of water, comprising, for example, in this embodiment a spout 43, towards the exterior of the vehicle. More precisely, these connection means comprise a series of flexible drains 44 spaced regularly along the frame, and rubbing along a spout 43 formed in each of the rails 15 and 16. The drains 44, made of rubber, represented in section in FIG. 4B, comprise a network of parallel ducts 45 of a few (for example 3) millimetres in diameter and narrower ducts 46 provided with fibres to benefit from an evacuation of a quantity of water by capillarity.

It will be noted that other means for the recovery and evacuation of water, and more generally of liquid, that the unit of reservoir, drain and tightness joint presented here can be provided without prejudicing the generality of one or more embodiments of the invention.

Figure 4D:
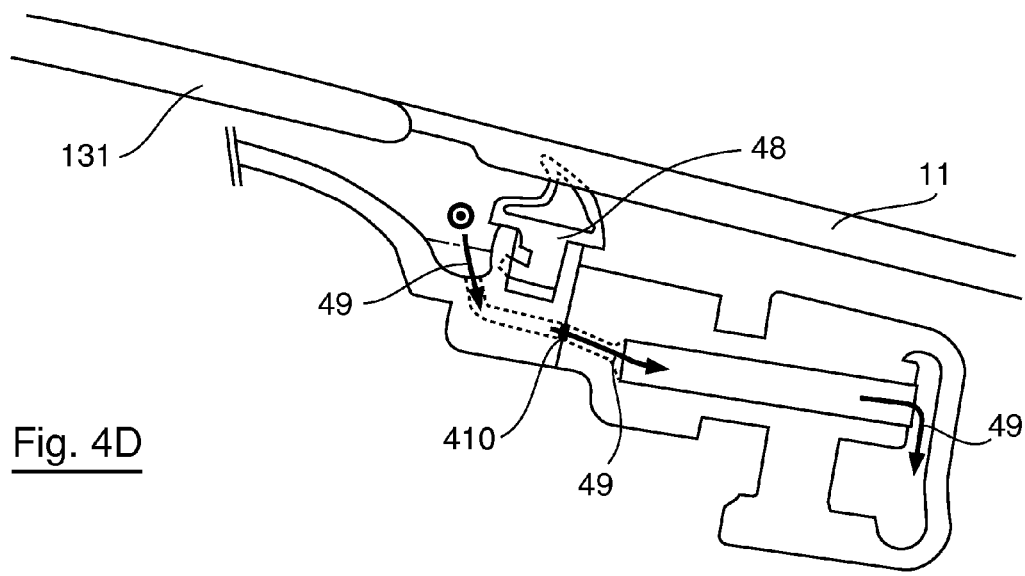

FIG. 4D illustrates in a view in section the evacuation path (arrows 49) of the water collected at the rear of the reservoir towards a spout 43 fixed on the glazed structure 11. As can be seen in this FIG. 4D, the connection of the reservoir with the spout 43 is realized when the sliding element 131 is in position of closure of the opening. In fact, in this position, the reservoir comes opposite means for freeing of a passage 410 towards the spout.

Figure 5:
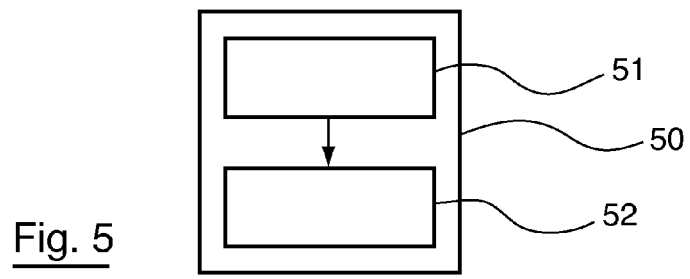
FIG. 5 illustrates a mounting method of the roof corresponding to FIG. 1 on the chassis of a vehicle.

FIG. 5 illustrates a method of mounting 50 of a pre-assembled roof as described in FIG. 1 on the chassis of a vehicle.

This mounting comprises the following successive stages:
stage 51 of placement of the roof on the vehicle, such that the exterior contour of the glazed structure coincides with the receiving surround provided for this purpose on the chassis of the vehicle;
stage 52 of securing the exterior contour and the receiving surround, in a flush manner.

Furthermore, the securing stage comprises a simultaneous securing of the second end of the retaining element with the chassis.

It should be noted that the assembly of the constitutive parts of the roof can likewise be realized in whole or part by the vehicle manufacturer on the vehicle itself. Furthermore, the use of an assembly line conventionally dedicated to the mounting of a fixed roof without an opening can be envisaged without great adaptation.

Figure 6:
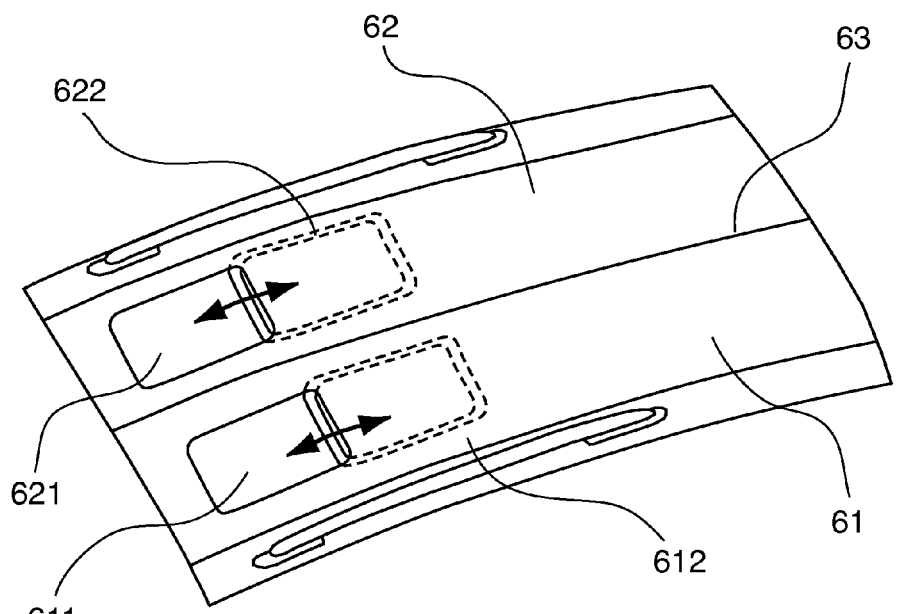
FIG. 6 illustrates a second embodiment of the invention, for which the glazed structure comprises two symmetrical openings.

Other variants of this embodiment can be envisaged, amongst which:
the glazed structure comprises two (or more) openings and two sliding elements, and more specifically, as shown in FIG. 6, the glazed structure 11 comprises two symmetrical portions 61, 62 each having an opening 611, 621 so as, for example, to offer to each of the occupants of the front seats of the vehicle his own opening, the covering of which by a sliding element 612, 622 is able to be regulated independently of the other opening and/or sliding element. It should be noted that this specific configuration allows a rail 63 to be provided for the guiding of the sliding elements which are common to the two openings;
the rails are brought together by clipping or by pushing back/snapping on the glazed structure, or formed directly thereon;
the first glazed panel has a general C-shape (in one or several pieces);
the rails and/or guiding means for the sliding element are shaped so as to compensate at least one of the curves of the glazed structure and/or of the sliding element;
the reinforcement element is formed in the functional frame;
the guiding means comprise one or more rollers and/or wheels;
small channels can be pierced and or thermoformed in the sliding element to facilitate the evacuation of the water deposited thereon.

In another further variant of the invention, the glazed structure is formed by a single glazed panel pierced by an opening.

It should be noted that, in the case of a double-curve panel, and so as to provide a curve in two directions to the single panel of such a glazed structure, this curve can be not realized on manufacture of the pane (which is not known to be done in a simple manner, in particular for a glass element, since an opening is provided). It suffices to arrange a pane having a single curve, to easily and efficiently realize the second curve, by means of rails, or any other longitudinal elements, themselves pre-formed with the desired curve (or a slightly greater curve). Thus, if the curve of the rail or rails before mounting is greater than that of a cylindrical panel equipped with the rail or rails, on mounting, the resistance to the curve of the panel means that the assembly takes the desired curve.

In a complementary embodiment of the embodiment presented above, motorised locking means can be provided.

In another further embodiment, it can be envisaged to realize the glazed structure and/or the sliding elements according to a manner of manufacture belonging to the group comprising:
- injected organic glass;
- extruded organic glass;
- thermoformed organic glass;
- hardened glass;
- laminated glass;
- assembly of two superimposed layers.

Numerous other technical functions can be integrated into the roof in the same manner, by moulding or overmoulding directly on one and/or possibly a second glazed layer. A pre-equipped roof is thus obtained in a simple and efficient manner, and at little cost. In a non-exhaustive manner, these technical functions can comprise:
- antennas;
- means for receiving an antenna;
- carrying systems such as, for example, racks, roof bars, . . . ;
- tightness joints;
- reinforcement elements, for example substantially similar to a structure frame, a traverse, a side-frame, . . . ;
- filtering and/or aeration and/or ventilation means;
- trims and/or contour joints;
- exterior protection films
- wiping means;
- aerodynamic appendices;
- personalisation means;
- means for fixing fittings and/or interior covering;
- rear view mirrors;
- interior and/or exterior lighting means;
- photovoltaic cells fixed on the exterior face of the fixed structure or of that of at least one of the sliding elements;
- means for receiving and/or fixing a rack bar;
- defrosting and/or heating means;
- concealment means;
- means for fixing and receiving a rear view mirror and/or one of more sunshields;
- means for the securing of reinforcement elements;
- means to assist the securing of the roof (temporary and/or final centering, guiding and/or fixing means);
- insulation and tightness joints (between, for example, the layers of double glazing and between the roof and the chassis);
- sound and thermal insulation means;
- means for receiving and/or fixing a tightness element;
- means for receiving and/or fixing filtering and/or aeration and/or ventilation means;
- bead trims, or means to receive the latter;
- an adhesive path;
- a cable path;
- means for receiving and/or fixing piping;
- piping;
- sensors, in particular of rain, temperature and/or sunlight;
- means for receiving and/or fixing storage means; . . .

Also, a method is provided for mounting a roof according as described herein on a motor vehicle. The method includes the following stages:
- placement of the roof (10) on the vehicle, so that the exterior contour of the glazed structure (11) coincides with the receiving surround (141) provided for this purpose on the chassis (140) of the vehicle;
- securing of the exterior contour and the receiving surround (141), in a flush manner. In an example, the securing stage includes a simultaneous securing of the second end with the said chassis (140).

In summary, an aspect of the disclosure provides a technique for a substantially glazed roof, which is as far as possible flush with the body of the motor vehicle, and which permits a maximized opening. In other words, an aspect of the disclosure improves the aesthetic rendering of the roof whilst improving its aerodynamic performances, providing this flush appearance.

In other words again, an aspect of the disclosure reduces or suppresses if not the presence, then at least the visual impression of discontinuity which is constituted by a frame, so that the glazed surface is perceived as a transparent portion forming continuity with the body.

An aspect of the disclosure provides such a technique, which allows the manufacture and the mounting of the roof to be simplified, and hence to greatly reduce the corresponding costs.

An aspect of the disclosure provides such a technique, increasing the window light area.

An aspect of the disclosure provides such a technique, allowing a replacement of a vehicle roof composed of a fixed pane by a roof according to the invention, without special adaptation on the vehicle.

Although the present disclosure has been described with reference to one or more examples, workers skilled in the art will recognize that changes may be made in form and detail without departing from the scope of the disclosure and/or the appended claims.

The invention claimed is:

1. Glazed roof of a motor vehicle, comprising:
   - at least one opening;
   - a fixed glazed structure carrying at least one sliding element inside said vehicle and configured to close said at least one opening,
   - said fixed glazed structure having a defined exterior contour to coincide with a receiving surround provided for this purpose on a chassis of said vehicle, such that said contour is configured to be secured to said receiving surround, in a flush manner,
   - wherein each of said sliding elements is guided along two rails secured to a surface of said fixed glazed structure, in a region distant from the exterior contour of said fixed glazed structure so as not to interfere with securing of the latter to said receiving surround of said chassis, wherein said at least one sliding element comprises a functional frame extending over its contour, and wherein said function frame carries at least one reservoir for recovery and evacuation of liquid;
   - at least one retaining element, a first end of which is integral with one of the rails and a second end of which is integral with the chassis, each of the retaining elements being arranged perpendicularly to the rail; and
   - wherein the roof comprises a connection, at least in an open position of said at least one sliding element, of the at least one reservoir to means for evacuation of liquid towards an exterior of the vehicle.

2. The glazed roof according to claim 1, wherein the roof comprises means for locking said sliding element in at least one predetermined position.

3. The glazed roof according to claim 2, wherein:
   - said locking means comprise at least one locking bolt, collaborating with at least one strike formed in one of the rails, and means for actuating said bolt or bolts, and said sliding element has a first and a second edge substantially perpendicular to its sliding axis, said at least one locking bolt being mounted in the vicinity of the said first edge and the actuating means being mounted in the vicinity of the said second edge, and means for transmission connecting the said actuating means and said at least one locking bolt.

4. The glazed roof according to claim 3, wherein the roof comprises two bolts cooperating respectively with each of the rails, and wherein the actuating means are placed in the middle of the second edge.

5. The glazed roof according to claim 1, wherein said functional frame forms at least one reinforcement element, carries the at least one reinforcement element, or both forms and carries the at least one reinforcement element.

6. The glazed roof according to claim 5, wherein the at least one reinforcement element cooperates with at least one of said rails and at least one of said retaining elements and said receiving surround of said chassis.

7. The glazed roof according to claim 1, wherein that said at least one sliding element carries a tightness joint, mounted so as to direct the liquid towards said at least one reservoir.

8. The glazed roof according to claim 1, wherein:
said at least one sliding element comprises an assembly of superimposed elements, formed by at least two transparent elements secured by a connecting frame, and
said at least one sliding element that comprises an assembly of superimposed elements carries at least one blind or a shielding screen of at least one portion of the transparent surface.

9. The glazed roof according to claim 1, wherein:
said fixed glazed structure; or said at least one sliding element presents at least one curve, and wherein said rails are shaped so as to compensate at least one of the curves, and
at least one of said curves is imposed on said fixed glazed structure.

10. The glazed roof according to claim 1, wherein the roof comprises two openings, and two sliding elements.

11. The glazed roof according to claim 10, wherein said glazed structure comprises two symmetrical portions, each carrying an opening.

12. The glazed roof according to claim 1, wherein at least one of the said sliding elements comprises balancing means, tending to control displacement of said at least one sliding element.

13. The glazed roof according to claim 1, wherein said fixed glazed structure is realized in a material belonging to the group consisting of:
injected organic glass;
extruded organic glass;
thermoformed organic glass;
hardened glass;
laminated glass;
assembly of two superimposed layers.

14. A method for mounting a roof on a motor vehicle, the roof comprising:
at least one opening;
a fixed glazed structure carrying at least one sliding element inside said vehicle and intended to close said at least one opening,
said fixed glazed structure having a defined exterior contour to coincide with a receiving surround provided for this purpose on a chassis of said vehicle, such that said contour can be secured to said receiving surround, in a flush manner,
wherein each of said sliding elements is guided along two rails secured to a surface of said fixed glazed structure, in a region distant from the exterior contour of said fixed glazed structure so as not to interfere with securing of the latter to said receiving surround of said chassis, wherein said at least one sliding element comprises a functional frame extending over its contour, and wherein said function frame carries at least one reservoir for recovery and evacuation of liquid;
at least one retaining element, a first end of which is integral with one of the rails and a second end of which is integral with the chassis, each of the retaining elements being arranged perpendicularly to the rail; and
wherein the roof comprises a connection, at least in an open position of said at least one sliding element, of the at least one reservoir to means for evacuation of liquid towards an exterior of the vehicle;
wherein the method comprises the following stages:
placement of the roof on the vehicle, so that the exterior contour of the glazed structure coincides with the receiving surround provided for this purpose on the chassis of the vehicle; and
securing of the exterior contour and the receiving surround, in a flush manner.

15. The mounting method according to claim 14, wherein said securing stage comprises a simultaneous securing of the second end with the chassis.

16. A motor vehicle comprising:
a chassis;
an interior; and
a roof, which comprises:
at least one opening,
a fixed glazed structure carrying at least one sliding element in the interior of the vehicle and intended to close the at least one opening,
the fixed glazed structure presenting an exterior contour coinciding with a receiving surround provided for this purpose on the chassis of the vehicle, so that the contour is configured to be secured to the receiving surround, in a flush manner,
wherein each of the sliding elements is guided along two rails secured to a surface of the fixed glazed structure, in a region distant from the exterior contour of said fixed glazed structure so as not to interfere with securing of the latter to the receiving surround of said chassis, wherein said at least one sliding element comprises a functional frame extending over its contour, and wherein said function frame carries at least one reservoir for recovery and evacuation of liquid,
at least one retaining element, a first end of which is integral with one of the rails and a second end of which is fixedly attached to the chassis, each of the retaining elements being arranged perpendicularly to the rail and configured to retain the rails and the sliding element to the chassis, in case the fixed glazed structure is broken, and
a connection, at least in an open position of said at least one sliding element, of the at least one reservoir to means for evacuation of liquid towards an exterior of the vehicle.

17. The glazed roof according to claim 1, wherein at least one of said sliding elements is realized in a material belonging to the group consisting of:
injected organic glass;
extruded organic glass;
thermoformed organic glass;
hardened glass;
laminated glass;
assembly of two superimposed layers.

* * * * *

UNITED STATES PATENT AND TRADEMARK OFFICE
CERTIFICATE OF CORRECTION

PATENT NO.       : 8,678,487 B2
APPLICATION NO.  : 12/518000
DATED            : March 25, 2014
INVENTOR(S)      : Billy et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1030 days.

Signed and Sealed this

Twenty-ninth Day of September, 2015

Michelle K. Lee
*Director of the United States Patent and Trademark Office*